(12) United States Patent
Chen et al.

(10) Patent No.: US 10,412,227 B2
(45) Date of Patent: Sep. 10, 2019

(54) VOICE COMMUNICATION PROCESSING METHOD AND SYSTEM, ELECTRONIC DEVICE, AND STORAGE MEDIUM

(71) Applicant: TENCENT TECHNOLOGY (SHENZHEN) COMPANY LIMITED, Shenzhen (CN)

(72) Inventors: Xiaobo Chen, Shenzhen (CN); Bin Li, Shenzhen (CN); Xiaomu Wen, Shenzhen (CN); Chi Xi, Shenzhen (CN); Junshan Wang, Shenzhen (CN); Cheng Luo, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 15/806,544

(22) Filed: Nov. 8, 2017

(65) Prior Publication Data

US 2018/0069963 A1 Mar. 8, 2018

Related U.S. Application Data

(63) Continuation of application No. PCT/CN2016/097033, filed on Aug. 26, 2016.

(30) Foreign Application Priority Data

Aug. 31, 2015 (CN) .......................... 2015 1 0548888

(51) Int. Cl.
*H04M 3/56* (2006.01)
*H04L 29/06* (2006.01)

(52) U.S. Cl.
CPC .......... *H04M 3/568* (2013.01); *H04L 63/083* (2013.01); *H04L 65/1073* (2013.01);
(Continued)

(58) Field of Classification Search
CPC .... H04M 15/858; H04M 15/00; H04M 15/70; H04M 15/715; H04M 15/72;
(Continued)

(56) References Cited

U.S. PATENT DOCUMENTS

| 2002/0087858 A1* | 7/2002 | Oliver | ..................... G06F 21/32 |
| | | | 713/156 |
| 2003/0144846 A1 | 7/2003 | Denenberg | |

(Continued)

FOREIGN PATENT DOCUMENTS

| CN | 101616223 A | 12/2009 |
| CN | 101894424 A | 11/2010 |

(Continued)

OTHER PUBLICATIONS

The State Intellectual Property Office of the People's Republic of China (SIPO) Office Action 1 for 201510548888.7 dated Nov. 6, 2017 11 Pages (including translation).

(Continued)

*Primary Examiner* — Akelaw Teshale
(74) *Attorney, Agent, or Firm* — Anova Law Group, PLLC

(57) ABSTRACT

The present disclosure discloses a voice communication processing method and system, an electronic device, and a storage medium. The method includes: initiating from a first account, through a first application, a voice activation request to a server side; receiving a verification code that is returned by the server side and that corresponds to the first account; calling, through the first application, a voice communication authorization interface to send an authentication request comprising the verification code to the server side; the server side providing an authentication result; and initiating operations of the voice communication service interface, based on the authentication result.

19 Claims, 5 Drawing Sheets

(52) U.S. Cl.
CPC .......... *H04L 65/403* (2013.01); *H04M 3/563* (2013.01); *H04L 63/0861* (2013.01); *H04M 2203/5009* (2013.01); *H04M 2203/6009* (2013.01); *H04M 2203/6054* (2013.01); *H04M 2203/6072* (2013.01); *H04M 2203/6081* (2013.01)

(58) Field of Classification Search
CPC ....... H04M 15/721; H04M 2215/7027; H04M 2215/7036; H04M 2215/7045; H04M 3/38; H04M 3/436; H04M 15/08; H04M 15/59; H04M 15/8083; H04M 2215/0192; H04M 3/42195; H04M 2201/39; H04M 2201/41; H04M 3/42059; H04M 3/4288; H04M 2207/18; H04M 3/568; H04M 1/645; H04M 1/658; H04M 1/80; H04M 2203/5009; H04M 2203/6009; H04M 2203/6054; H04M 2203/6072; H04M 3/42153; H04M 3/42161; H04M 3/537; H04M 3/561; H04M 3/563; H04M 3/569
USPC ......... 379/158, 163, 201.04, 202.01, 205.01, 379/206.01, 393, 67.1, 68, 77, 87, 88.02, 379/88.1, 88.12, 88.16, 91.01, 93.12
See application file for complete search history.

(56) References Cited

U.S. PATENT DOCUMENTS

| | | | | |
|---|---|---|---|---|
| 2006/0140356 | A1* | 6/2006 | Bossemeyer, Jr. ...... | H04M 1/57 379/88.1 |
| 2013/0138496 | A1* | 5/2013 | Jin ......................... | G06Q 30/02 705/14.26 |
| 2014/0044242 | A1* | 2/2014 | Hodge ................... | H04M 3/533 379/68 |
| 2015/0087265 | A1* | 3/2015 | Disraeli ................ | H04W 12/06 455/411 |
| 2015/0312236 | A1* | 10/2015 | Ducker ................... | H04L 63/08 726/4 |
| 2016/0028741 | A1* | 1/2016 | Zhang ..................... | G06F 21/36 726/5 |
| 2016/0232588 | A1* | 8/2016 | Harmer .............. | G06Q 30/0609 |

FOREIGN PATENT DOCUMENTS

| | | |
|---|---|---|
| CN | 102438086 A | 5/2012 |
| CN | 102571833 A | 7/2012 |
| CN | 102811228 A | 12/2012 |
| CN | 102833753 A | 12/2012 |
| CN | 103179026 A | 6/2013 |
| CN | 104104514 A | 10/2014 |
| CN | 104168294 A | 11/2014 |
| CN | 104618315 A | 5/2015 |
| CN | 104661191 A | 5/2015 |
| CN | 104734946 A | 6/2015 |
| CN | 105208014 A | 12/2015 |
| JP | 2005056126 A | 3/2005 |
| JP | 2013529410 A | 7/2013 |
| WO | 2011126506 A1 | 10/2011 |
| WO | 2015093058 A1 | 6/2015 |

OTHER PUBLICATIONS

Jin Wang et al. "Wireless Voice-over-IP and Implications for Third-Generation Network Design" IEEE. Sep. 30, 1998. pp. 79-97.

Bangyun Li "Research on Optimization of WeChat public number in Library" Library Development, Nov. 20, 2014. pp. 41-45.

The World Intellectual Property Organization (WIPO) International Search Report for PCT/CN2016/097033 dated Nov. 17, 2016 5 Pages (including translation).

The Japan Patent Office (JPO) Notification of Reasons for Refusal for Application No. 2017-558965 dated Jan. 8, 2019 6 Pages (including translation).

Korean Intellectual Property Office (KIPO) Notification of Reason for Refusal for 10-2017-7033642 dated Mar. 22, 2019 10 Pages (including translation).

* cited by examiner

VOICE COMMUNICATION PROCESSING METHOD AND SYSTEM, ELECTRONIC DEVICE, AND STORAGE MEDIUM

RELATED APPLICATION

The present disclosure claims priority to PCT Application No. PCT/CN2016/097033, filed on Aug. 26, 2016, which claims priority of Chinese Patent Application No. 2015105488887, filed on Aug. 31, 2015. Both applications are incorporated by reference in its entirety.

FIELD OF THE TECHNOLOGY

The present disclosure relates to communication management technologies in the field of information processing, and in particular, to a voice communication processing method and system, an electronic device, and a storage medium.

BACKGROUND OF THE DISCLOSURE

In existing voice communications performed between multiple users by using a third party application, voice data interactions between multiple users are often completed by using an interface provided by the third party application. However, security of voice communication between users often cannot be ensured and audio data transfer conflicts may occur.

SUMMARY

In view of this, an objective of embodiments of the present disclosure is to provide a voice communication processing method and system, an electronic device, and a storage medium, to resolve at least the foregoing problems in the existing technology.

One aspect of the present disclosure provides a voice communication processing method, applied to an electronic device, and including: initiating from a first account, through a first application, a voice activation request to a server side; receiving a verification code that is returned by the server side and that corresponds to the first account; calling, through the first application, a voice communication authorization interface to send an authentication request comprising the verification code to the server side; the server side providing an authentication result; and initiating operations of the voice communication service interface, based on the authentication result.

Another embodiment of the present disclosure provides an electronic device, including: an application management unit, configured to: through first application and using a first account, send a voice activation request to a server side; receive a verification code that is returned by the server side and that corresponds to the first account; and call, through the first application, a voice communication authorization interface to send an authentication request comprising the verification code to the server side; and a voice communication management unit, configured to: send, by using the voice communication authorization interface, the authentication request comprising the verification code to the server side; and initiate, based on an authentication result received from the server side, an operation of calling a voice communication service interface.

Another embodiment of the present disclosure further provides a voice communication processing system, including an electronic device and a server. The electronic device is configured to: send, through a first application using a first account, a voice activation request to a server side; receive a verification code that is returned by the server side and that corresponds to the first account; and call, by using the first application, a voice communication authorization interface to send an authentication request comprising the verification code to the server side; and initiate, based on an authentication result sent by the server side, an operation of calling a voice communication service interface. The server is further configured to: determine, according to the voice activation request, that the first account is a legitimate account; and allocate the corresponding verification code to the first account; and authenticate, based on the verification code comprised in the authentication request, whether the first application using the first account can call the voice communication service interface, and obtain the authentication result.

Another embodiment of the present disclosure further provides a computer storage medium, storing one or more computer instructions, and when executed by at least one processor, the computer instructions perform the following operations: initiating, through first application using a first account, a voice activation request to a server side, wherein the server side determines, according to the voice activation request, that the first account is a legitimate account, and allocates a corresponding verification code to the first account; receiving the verification code from the server side; calling, through the first application, a voice communication authorization interface to send an authentication request comprising the verification code to the server side, wherein the server side authenticates, based on the verification code comprised in the authentication request, whether the first application using the first account can call a voice communication service interface, and obtains an authentication result; and initiating, based on the authentication result sent by the server side, an operation of the voice communication service interface.

According to the voice communication processing method and system, the electronic device, and the storage medium that are provided in embodiments of the present disclosure, a first application using a first account may be used to initiate a voice activation request to a server side. The server side may determine, according to the voice activation request, that the first account is a legitimate account. A verification code that is returned by the server side and that corresponds to the first account may be received. A voice communication authorization interface may then be called by using the first application to send an authentication request including the verification code to the server side. An operation of calling a voice communication service interface may be initiated based on an authentication result sent by the server side. In embodiments of the present disclosure, a server interface for secure voice communication can be provided to a third party application, with improved security when a user uses the third party application. In addition, an audio function provided in the third party application need not be used. Therefore, a problem of audio transfer conflicts occurring in the third party application is avoided, and further preventing any problem caused by different incompatible third party applications.

DESCRIPTION OF EMBODIMENTS

The following further describes embodiments of the present disclosure in detail with reference to the accompanying drawings and specific embodiments.

Figure 1:
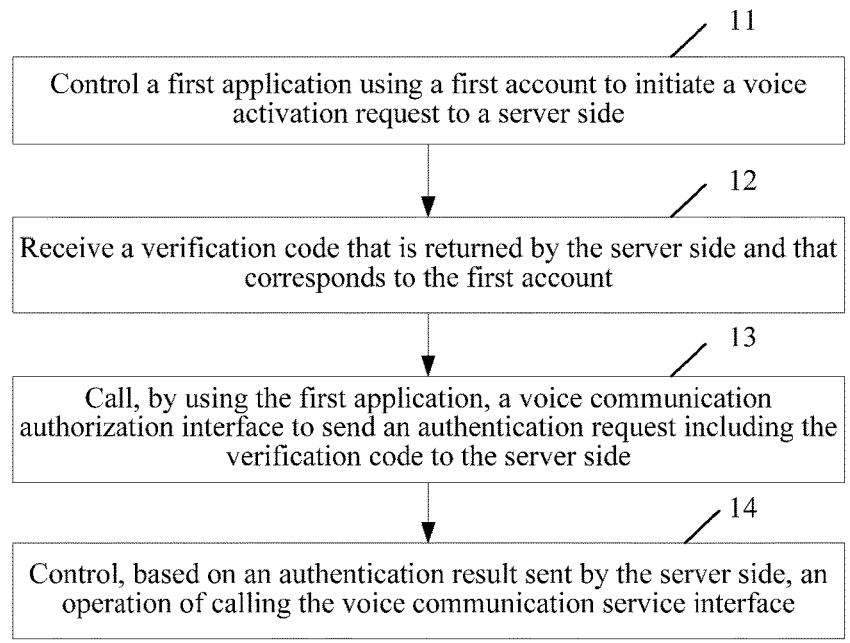
FIG. 1 is a first schematic flowchart of a voice communication processing method according to an embodiment of the present disclosure.

This embodiment of the present disclosure provides a voice communication processing method, applied to an electronic device. As shown in FIG. 1, the method includes the following steps.

Step 11: Control a first application using a first account to initiate a voice activation request to a server side, so that the server side determines, according to the voice activation request, that the first account is a legitimate account, and allocates a corresponding verification code to the first account.

Step 12: Receive the verification code that is returned by the server side and that corresponds to the first account.

Step 13: Call, by using the first application, a voice communication authorization interface to send an authentication request including the verification code to the server side, so that the server side may authenticate, based on the verification code included in the authentication request, whether the first application using the first account can call a voice communication service interface, and obtain an authentication result.

Step 14: Control, based on the authentication result sent by the server side, an operation of calling the voice communication service interface.

In this embodiment, the electronic device may be a device such as a smartphone, a tablet computer, or a desktop computer. At least one third party application (that is, the first application) can be installed and run in the electronic device. The third party application may be an application that has a requirement on multi-user voice communication.

The first application may be any one of the at least one third party application installed in the electronic device. For example, a user installs an application A, an application B, and an application C. The application A may be used as the first application in this embodiment if the application A is currently enabled on the device.

The first account may be an account used by the user to log in to the first application. The first account may be obtained by performing, by using the first application, registering on a corresponding server of the first application on the server side. The first account may specifically include information such as an account name and an account password that are used by the user to log in to the first application.

Initiation of the voice activation request may be that the user sends the voice activation request by using the first account after enabling the third party application, and logging in to the third party application based on the first account. The voice activation request includes at least: identification information of the first application and the first account.

The identification information of the first application may be information such as a name and/or a number of the first application.

Correspondingly, according to the voice activation request, the server side determines that the first account is a legitimate account. The server may be obtaining a list of legitimate accounts based on the identification information of the first application, and determining that the first account is a legitimate account if the first account is in the list of legitimate accounts. It may be understood that in this embodiment, the server side is not necessarily only one server, but may be a server cluster including multiple servers. The foregoing operation of verifying legitimacy of the account may be an operation performed by the server corresponding to the first application on the server side.

In addition, allocation of the corresponding verification code to the first account may be an operation performed by a voice communication authentication platform of the server side. The voice communication authentication platform may be an SDK platform.

In some embodiments, the method for obtaining the verification code may be instructing, by the server corresponding to the first application, a voice communication authorization server to allocate the verification code.

In the present disclosure, the first application can be bound to the corresponding voice communication service interface by means of allocation of the verification code. A specific operation may be calling, by using the first application, the voice communication authorization interface to send the authentication request including the verification code to the server side, so that the server side performs authentication based on the authentication request, and obtains the authentication result. The authentication result may include at least the first account and an authorization account.

In addition, in this embodiment, based on the authentication result sent by the server side, calling the voice communication service interface includes: when the authentication result sent by the server side indicates that authentication succeeds, controlling the first application using the first account to call the voice communication service interface to perform voice communication processes; that is, when the authentication result indicates that authentication succeeds, obtaining, by the first application, that is, the third party application, permission to use a server interface for voice communication.

It may be understood that in this embodiment, the voice communication authorization interface and the voice communication service interface are based on a same software development suit, for example, a software development kit (SDK). For specific implementations of the interface, refer to Tables 1-3. As can be seen, because a same software development suit is used for all third party applications in the electronic device, complexity of interfaces used by a third party application for implementing multi-user voice communication may be greatly reduced, and adaption difficulty of the third party application is reduced.

Assuming that the SDK is used for processing in this embodiment, corresponding SDK interfaces may be shown in Table 1-Table 2 below.

TABLE 1

| Names of interfaces | Meanings of interfaces | Meanings of parameters |
| --- | --- | --- |
| (instancetype) sharedInstance | Singleton interface | |
| (BOOL) init: (NSString *) appID with ClientID: (NSString *) clientID delegate: (id<WXCMultiTalkApiDelegate>) delegate | Initialize an interface | appID: an ID for identifying an identity of an application<br>clientID: an identity (ID) of a current user<br>delegate: a status related to multi-user voice communication is notified to an application by using the delegate |
| -(BOOL) unInit | Un-initialize an interface | |
| -(BOOL) reqAuth: (NSString *) code | Called when an App is not authorized | Code: used for security verification |
| -(BOOL) enterMultiTalk: (NSString *) uniqueID | Enter multi-user voice communication by using a unique ID, and call back a notification by means of onEnterMultiTalk after the multi-user voice communication is successfully entered | uniqueID: a unique ID selected by an application and owned by each party in multi-user communication |
| -(BOOL) exitMultiTalk | Exit current multi-user communication, and call back a notification by means of onExitMultiTalk after the multi-user communication is successfully existed | |
| -(void)setMultiTalkMute: (BOOL) bMuteOn | Set multi-user voice communication to a mute state, and the multi-user voice communication is in an unmute state by default | bMuteOn:<br>YES: mute, a call no longer sends voice data to another member<br>NO: unmute, a caller sends the voice data to another member |
| -(void) setMultiTalkSpeaker: (BOOL) bSpeakerOn | Set multi-user voice communication to a speakerphone state, and multi-user communication is in a speakerphone state by default when no headset or Bluetooth is used | bSpeakerOn:<br>YES: turn on a speaker<br>NO: turn off a speaker |

The Callback interface (WXCMultiTalkApiDelegate) may be as follows.

TABLE 2

| Names of callback interfaces | Meanings of callback interfaces | Meanings of parameters |
| --- | --- | --- |
| -(void) onAuthSucceed | Callback notification of App authorization, that authorization succeeds is returned when reqAuth is called | |
| -(void) onEnterMultiTalk | Callback notification indicating that voice communication is successfully entered | |
| -(void) onExitMultiTalk | Callback notification indicating that multi-user voice communication is successfully exited | |
| -(void) onMemberChange: (NSArray *) memberList | Callback notification indicating that members in multi-user voice communication change | memberList:<br>List of users that are currently performing multi-user voice communication in uniqueID, where an object type of memberList is NSString*, whose value represents clientID transferred in init |

TABLE 2-continued

| Names of callback interfaces | Meanings of callback interfaces | Meanings of parameters |
| --- | --- | --- |
| -(void) onTalkingMember: (NSArray *) memberList | Callback notification indicating a list of users that are speaking in multi-user voice communication, callback is performed every second | memberList: List of users that are currently speaking, an object type of memberList is NSString*, whose value represents clientID transferred in init |
| -(void) onMultiTalkReady | Callback notification after multi-user voice communication is ready (users may start speaking) | |
| -(void) onMuteStateChange: (BOOL) bMuteOn | Callback notification of a mute state | bMuteOn: YES: mute NO: unmute |
| -(void) onSpeakerStateChange: (BOOL) bSpeakerOn | Callback notification of a microphone state | bSpeakerOn: YES: Turn on a speaker NO: Turn off a speaker |
| -(void) onErr: (WXCMultiTalkErrType) errType | Callback notification of all errors | errType: For details, refer to WXCMultiTalkErrType |

In addition, types and definitions of error code defined in the SDK are shown in Table 3.

TABLE 3

| Types of error code | Meanings of error code |
| --- | --- |
| WXCMultiTalkErrTypeAuthFailed | Authorization fails |
| WXCMultiTalkErrTypeEnterFailed | Fail to join multi-user communication |
| WXCMultiTalkErrTypeEngineFailed | The multi-user communication engine fails |
| WXCMultiTalkErrTypeDeviceFailed | The multi-user communications device fails |
| WXCMultiTalkErrTypeTalkingFailed | Abnormally exit communication |
| WXCMultiTalkErrTypeAudioPermissonDenied | The system has not given permission to the microphone |

Figure 2:
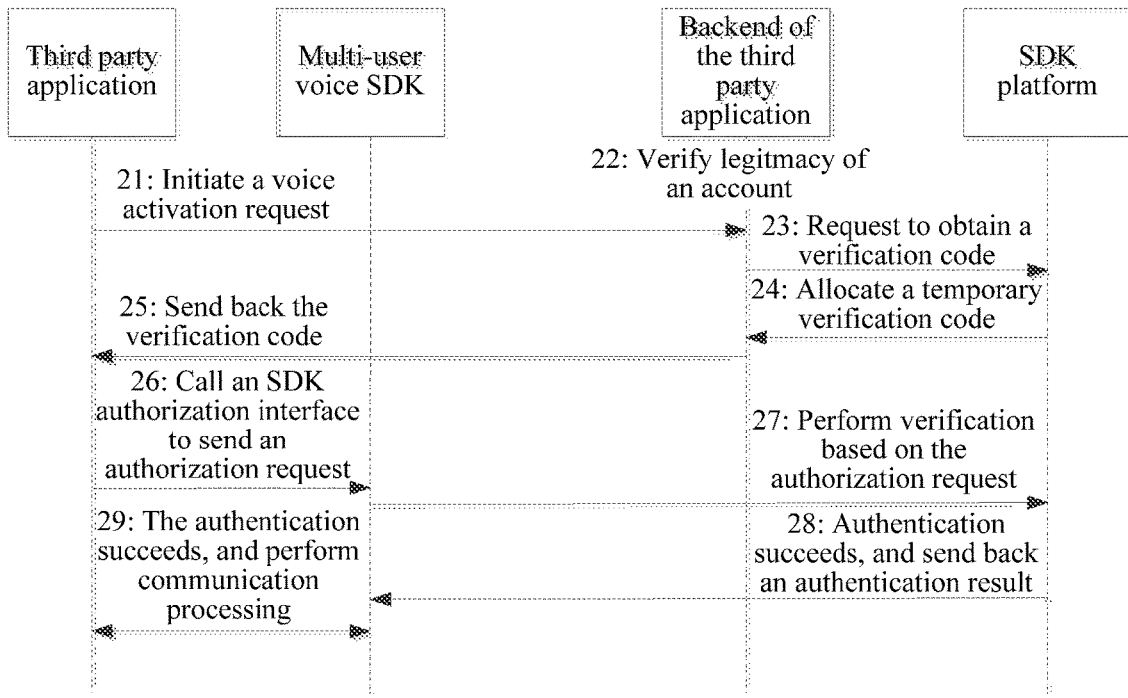
FIG. 2 is a second schematic flowchart of a voice communication processing method according to an embodiment of the present disclosure.

To address safety concerns, for example, to prevent various game bots from maliciously using a multi-user voice function, all third party applications accessing the SDK can start subsequent voice communication only after authentication activation is performed when all the third party applications are used for the first time. An authentication operation provided in this embodiment is described below in detail with reference to FIG. 2.

Step 21: A third party application may request from a backend of the third party application for a verification code for authentication activation when the third party application is used for the first time.

Step 22: The third party application verifies legitimacy of an account of a terminal requesting a verification code.

Step 23: The backend of the third party application applies for a code from a backend (e.g., a backend for contacts of WeChat) of an SDK platform by using an https request, where the https request carries ClientID information.

Step 24: The backend of the SDK platform allocates a code to the backend of the third party application, and temporarily associates the code with a ClientID.

Step 25: The backend of the third party application returns the code to a terminal of the third party application.

Step 26: The third party application calls a reqAuth interface of the SDK to transfer the code and the ClientID, where the request is sent to the backend of the SDK platform for authentication verification.

Step 27: The backend of the SDK platform verifies whether the received code matches the ClientID.

Step 28: The backend of the SDK platform allocates, to the third party application, an authorization account associated with the ClientID after verifying that the code matches the ClientID, and returns the authorization account to the SDK platform.

Step 29: The SDK maintains the received authorization account, and notifies that authentication activation on the third party application succeeds. Multi-user voice communication may be initiated after the authentication activation succeeds.

It is apparent that, by means of the foregoing solution, a first application using a first account may be used to initiate a voice activation request to a server side, so that the server side determines, according to the voice activation request, that the first account is a legitimate account. A verification code that is returned by the server side and that corresponds to the first account is received. A voice communication authorization interface is called by using the first application to send an authentication request including the verification code to the server side. An operation of calling a voice communication service interface is controlled based on an authentication result sent by the server side. In this way, a server interface for secure voice communication can be provided to a third party application, thereby improving security when a user uses the third party application. In addition, an audio function provided in the third party application is not used. Therefore, a problem of audio conflict occurring in the third party application is avoided, and a problem that different third party applications are not compatible can be avoided.

This embodiment of the present disclosure provides a voice communication processing method, applied to an electronic device. As shown in FIG. 1, the method includes the following steps:

Step 11: Control a first application using a first account to initiate a voice activation request to a server side, so that the server side determines, according to the voice activation request, that the first account is a legitimate account, and allocates a corresponding verification code to the first account.

Step 12: Receive the verification code that is returned by the server side and that corresponds to the first account.

Step 13: Call, by using the first application, a voice communication authorization interface to send an authentication request including the verification code to the server side, so that the server side authenticates, based on the verification code included in the authentication request, whether the first application using the first account can call a voice communication service interface, and obtains an authentication result.

Step 14: Control, based on the authentication result sent by the server side, an operation of calling the voice communication service interface.

In this embodiment, the electronic device may be a device such as a smartphone, a tablet computer, or a desktop computer. At least one third party application (corresponding to the foregoing first application) can be installed and run in the electronic device. The third party application may be an application that has a requirement on multi-user voice communication.

The first application may be any one of the at least one third party applications installed in the electronic device. For example, a user may install an application A, an application B, and an application C. The application A may be used as the first application in this embodiment if the application A is currently enabled.

The first account may be an account used by the user to log in to the first application. The first account may be obtained by performing, by using the first application, registering on a corresponding server of the first application on the server side. The first account may specifically include information such as an account name and an account password that are used by the user to log in to the first application.

Initiation of the voice activation request may be done by the user sending the voice activation request by using the first account after enabling the third party application, and logging in to the third party application using the first account. The voice activation request includes at least the identification information of the first application and the first account.

The identification information of the first application may be information such as a name and/or a number of the first application.

Correspondingly, that the server side determines, according to the voice activation request, that the first account is a legitimate account may be obtaining a list of legitimate accounts based on the identification information of the first application, and determining that the first account is a legitimate account if the first account is in the list of legitimate accounts. It may be understood that in this embodiment, the server side is not necessarily only one server, but may be a server cluster including multiple servers. The foregoing operation of verifying legitimacy of the account may be an operation performed by the server corresponding to the first application on the server side.

In addition, allocation of the corresponding verification code to the first account may be an operation performed by a voice communication authentication platform of the server side. The voice communication authentication platform may be an SDK platform.

In some embodiments, the method for obtaining the verification code may be instructing, by the server corresponding to the first application, a voice communication authorization server to allocate the verification code.

In the present disclosure, the first application can be bound to the corresponding voice communication service interface by means of the allocation of the verification code. A specific operation may call, by using the first application, the voice communication authorization interface to send the authentication request including the verification code to the server side, so that the server side performs authentication based on the authentication request, and obtains the authentication result. The authentication result may include at least the first account and an authorization account.

In addition, in this embodiment, the controlling, based on the authentication result sent by the server side, an operation of calling the voice communication service interface includes: when the authentication result sent by the server side indicates that authentication succeeds, controlling the first application using the first account to call the voice communication service interface to perform voice communication processes, that is, when the authentication result indicates that authentication succeeds, obtaining, by the first application, that is, the third party application, permission to use a server interface for voice communication.

It may be understood that in this embodiment, the voice communication authorization interface and the voice communication service interface are based on a same software development suit, for example, an SDK.

In addition, the controlling the first application using the first account to call the voice communication service interface to perform voice communication processes includes: obtaining an authorization identifier for the first account from the authentication result; and controlling the first application using the first account to obtain authorization for the voice communication interface based on the authorization identifier, and exchanging voice data by using the voice communication service interface.

Figure 3:
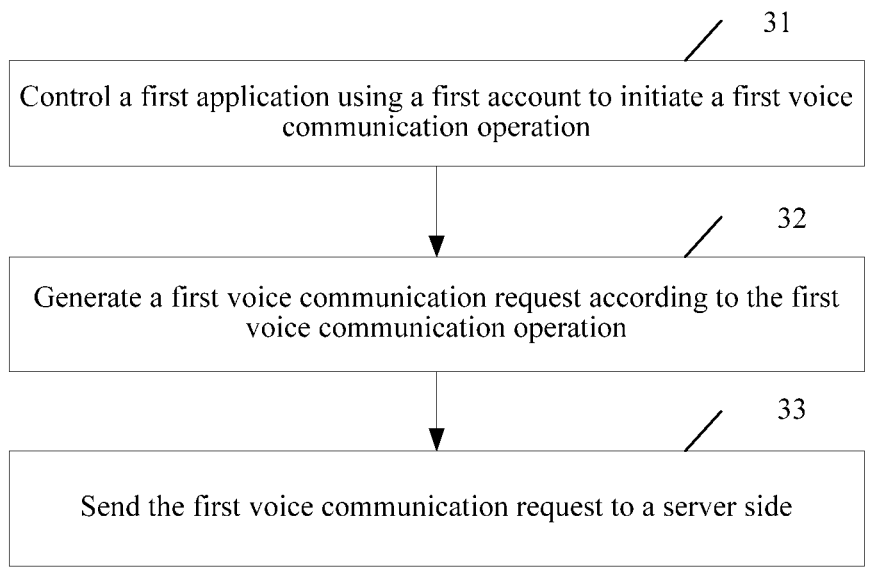
FIG. 3 is a third schematic flowchart of a voice communication processing method according to an embodiment of the present disclosure.

A method for establishing a voice communication group when a voice communication operation is performed in this embodiment is described below with reference to FIG. 3. Specifically, the controlling the first application using the first account to obtain authorization for the voice communication interface based on the authorization identifier, and exchanging voice data by using the voice communication service interface includes the following steps.

Step 31: Control the first application using the first account to initiate a first voice communication operation.

Step 32: Generate a first voice communication request according to the first voice communication operation, where the first voice communication request includes the authorization identifier of the first account and a communications identifier of first voice communication.

Step 33: Send the first voice communication request to the server side, so that the server side generates a first voice communication group according to the authorization identifier of the first account and the communications identifier of the first voice communication in the first voice communication request, and instructs the first application that is in the electronic device and that uses the first account to join the first voice communication group.

Figure 4:
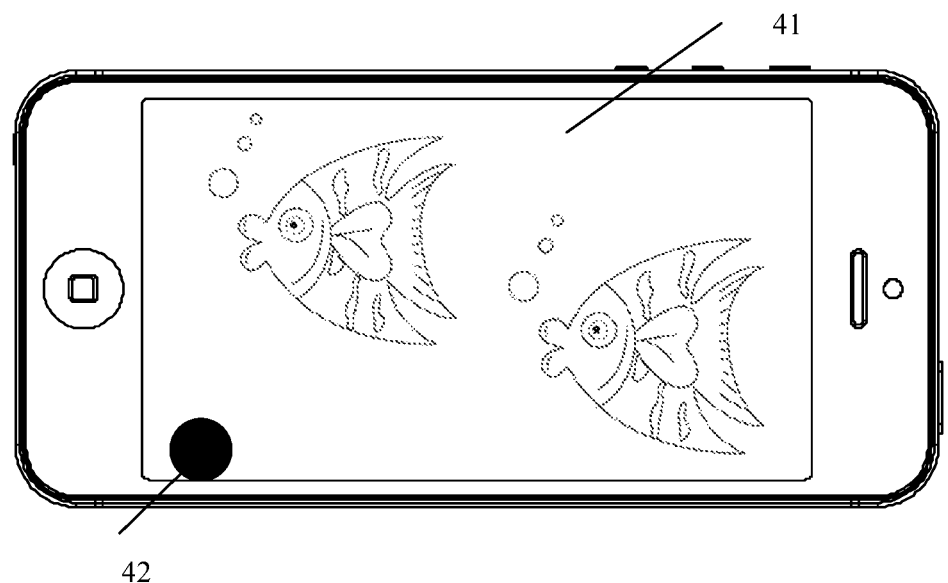
FIG. 4 is a schematic diagram of an operation scenario according to an embodiment of the present disclosure.

The method for initiating the first voice communication operation may be: tapping a button for communication by using an operation interface, and determining the operation of initiating the first voice communication operation after detecting that the button is tapped. As shown in FIG. 4, assuming that a button 42 for voice communication is displayed on a display interface 41 of the current first application, a user may tap the button 42 to initiate the first voice communication operation.

The generating a first voice communication request according to the first voice communication operation may be: generating the first voice communication request including at least the identification information of the first application, the name of the first account, the authorization identifier of the first account, and the communications identifier of the first voice communication. The communications identifier of the first voice communication may be a unique identifier (UniqueID).

In addition, the first voice communication operation is a voice communication operation currently initiated by the user.

The sending the first voice communication request to the server side may be: sending the first voice communication request to the server side by using the voice communication service interface. Correspondingly, that the server side generates a first voice communication group based on the first voice communication request may be: generating the first voice communication group for the current first voice communication request based on the identification information of the first application, the name of the first account, the authorization identifier of the first account, and the communications identifier of the first voice communication in the first voice communication request, and generating identification information for the voice communication group. It may be understood that the identification information of the first voice communication group uniquely maps and corresponds to the communications identifier of the first voice communication.

Figure 5:
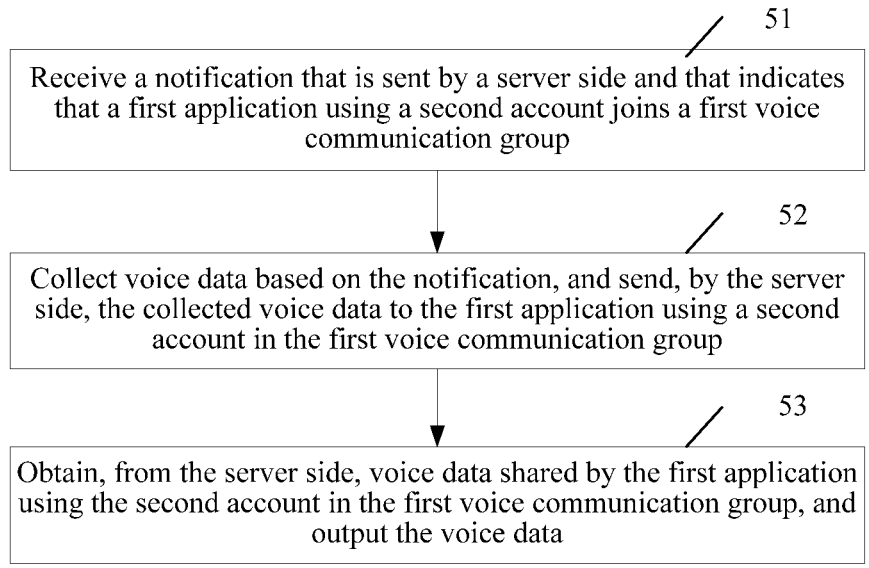
FIG. 5 is a fourth schematic flowchart of a voice communication processing method according to an embodiment of the present disclosure.

In some embodiments, based on the foregoing operations, this embodiment may further provide an operation method for performing communication based on the established first voice communication group. As shown in FIG. 5, the method further includes the following steps.

Step 51: Receive a notification that is sent by the server side and that indicates that the first application using a second account is joining the first voice communication group, wherein the second account is an account that is used by an electronic device different from the electronic device used to log in to the first application.

Step 52: Collect voice data based on the notification, and send, by using the server side, the collected voice data to the first application using the second account in the first voice communication group.

Step 53: Obtain, from the server side, voice data shared by the first application using the second account in the first voice communication group, and output the voice data.

Step 52 and Step 53 are not sequentially performed. Step 52 may be first performed and then step 53 is performed; or step 53 may be first performed and then step 52 is performed.

The first application using the second account may be logged in to by another user other than the user of the electronic device in this embodiment, by using the second account and the electronic device.

The collection of the voice data may be voice data collection performed by enabling a microphone of the electronic device. In addition, the voice data may be played by using a speaker of the electronic device.

Figure 6:
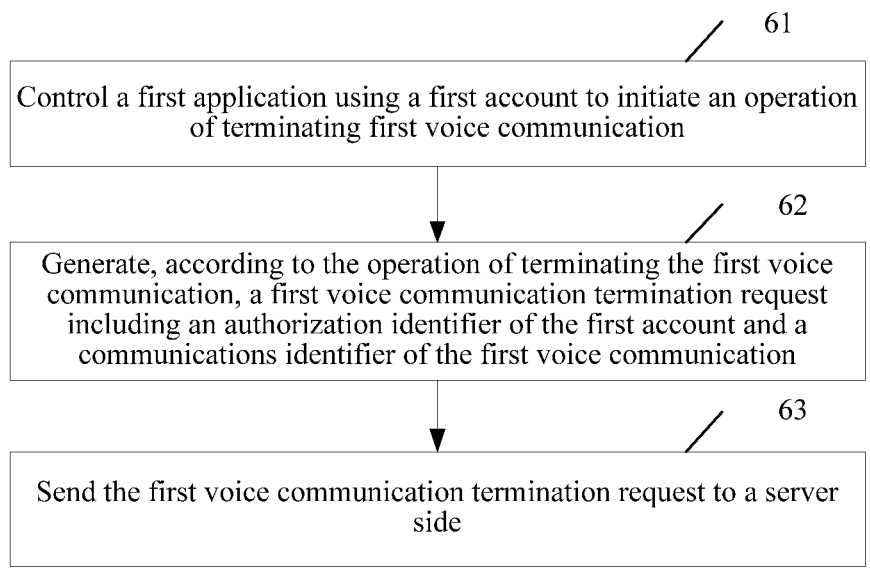
FIG. 6 is a fifth schematic flowchart of a voice communication processing method according to an embodiment of the present disclosure.

Further, this embodiment may further provide a procedure for sending the foregoing communication. As shown in FIG. 6, the method further includes:

Step 61: Control the first application using the first account to initiate an operation of terminating the first voice communication.

Step 62: Generate, according to the operation of terminating the first voice communication, a first voice communication termination request including the authorization identifier of the first account and the communications identifier of the first voice communication.

Step 63: Send the first voice communication termination request to the server side, so that the server side deletes, according to the authorization identifier of the first account and the communications identifier of the first voice communication in the first voice communication termination request, the first application using the first account from the corresponding first voice communication group.

The first voice communication termination request includes at least the communications identifier of the first voice communication and the authorization identifier of the first account, and in addition, may further include information such as identification information of the first application and a name of the first account.

After deleting the first application using the first account from the corresponding first voice communication group, the electronic device side may turn off a voice collection apparatus, for example, turn off the microphone.

Figure 7:
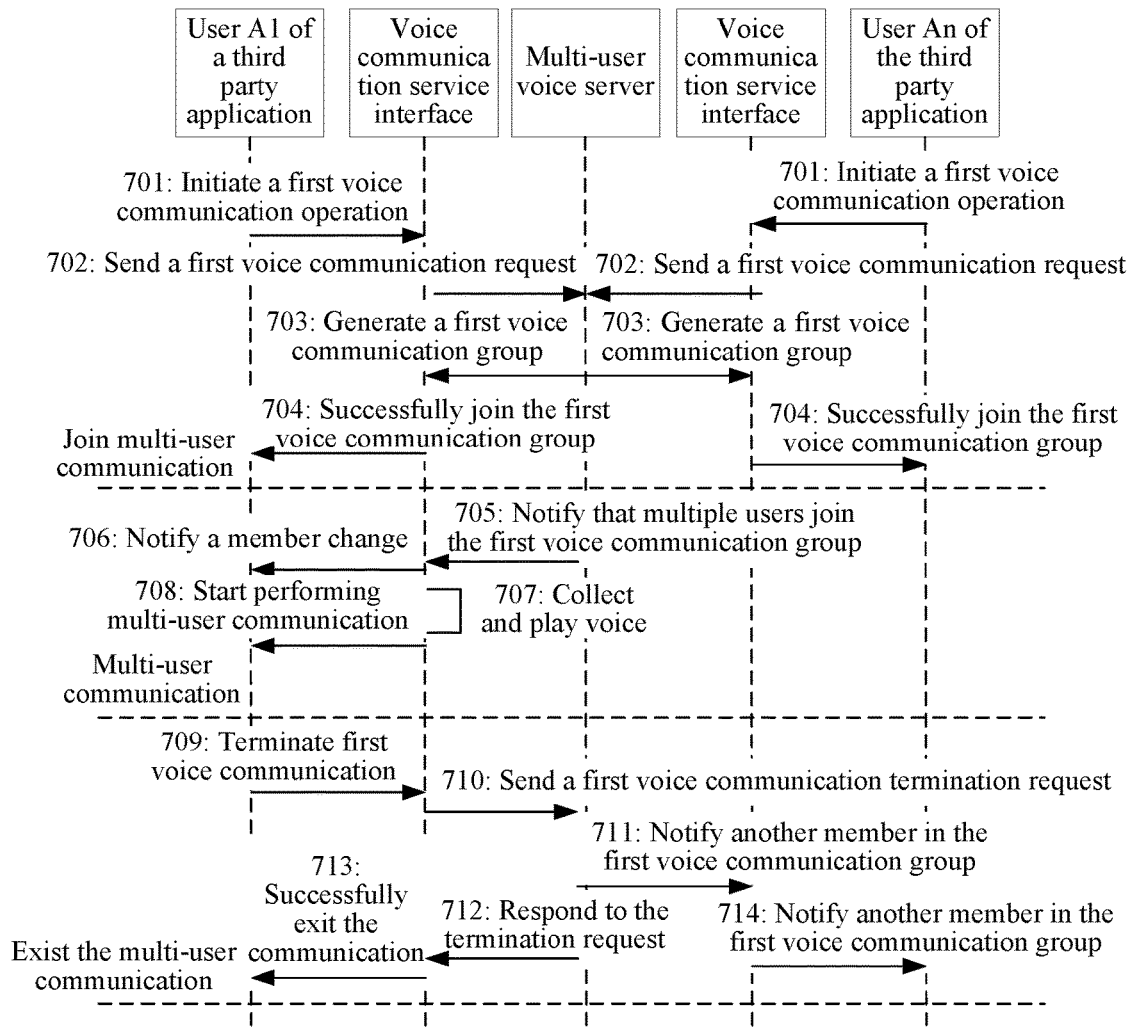
FIG. 7 is a sixth schematic flowchart of a voice communication processing method according to an embodiment of the present disclosure.

A voice communication scenario in this embodiment is described below with reference to FIG. 7. Interface calling forms in joining and existing multi-user communication, speaking in multi-user communication, and member changes are presented. A procedure of interaction between an SDK and a multi-user voice server is also presented. Specific steps are as follows.

Step 701: Users Al to An of the third party application initiate the first voice communication operation, and call an enterMultiTalk interface according to the initiation operation on the first voice communication, to transfer a same uniqueID.

Step 702: An SDK voice communication service interface sends the first voice communication request to a multi-user voice server, and the multi-user voice server allocates a unique groupID (a server end maintains a mapping relationship between the uniqueID and the groupID) to this communication.

Step 703: The SDK voice communication service interface receives an enterMultiTalkResp response, and generates the first voice communication group, and buffers the groupID brought by the server end, where the value is transparent to the third party application.

Step 704: The SDK voice communication service interface notifies, by means of an onEnterMultiTalk interface callback, that the third party application successfully joins multi-user communication.

Step 705: The multi-user voice server notifies all members in the multi-user communication after receiving a new Enter request for joining the first voice communication group.

Step 706: The SDK notifies, by means of an onMemberChange interface callback, the third party application that there is a member change.

Step 707: The SDK turns on an audio device when detecting that there are more than two members in current multi-user communication, to start collecting and playing voice data.

Step 708: The SDK notifies, by means of an onMultiTalkReady interface callback, that the third party application may start performing voice communication with another member.

Step 709: The third party application prepares to exit multi-user communication by calling an exitMutiTalk interface.

Step 710: The SDK sends a first voice communication termination request (an exitMultiTalkReq request) to the multi-user voice server.

Step 711: the multi-user voice server notifies, when receiving the exit request, all members that currently successfully joined the multi-user communication.

Step 712: The SDK receives an exitMultiTalkResp response result.

Step 713: The SDK notifies, by means of an onExitMultiTalk interface callback, that the third party application successfully exists the multi-user communication.

Step 714: Another member that has joined the multi-user communication receives an onMemberChange callback notification.

As can be seen, by means of the foregoing solution, a first application using a first account may be controlled to initiate a voice activation request to a server side, so that the server side determines, according to the voice activation request, that the first account is a legitimate account. A verification code that is returned by the server side and that corresponds to the first account is received. A voice communication authorization interface is called by using the first application to send an authentication request including the verification code to the server side. An operation of calling a voice communication service interface is controlled based on an authentication result sent by the server side. In this way, a server interface for secure voice communication can be provided to a third party application, thereby improving security when a user uses the third party application. In addition, an audio function provided in the third party application is not used. Therefore, a problem of audio conflict occurring in the third party application is avoided, and a problem that different third party applications are not compatible can be avoided.

Figure 8:
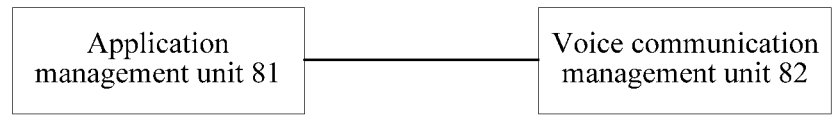
FIG. 8 is a first schematic structural diagram of an electronic device according to an embodiment of the present disclosure.

An embodiment of the present disclosure provides an electronic device. As shown in FIG. 8, the electronic device includes: an application management unit 81, configured to: control a first application using a first account to send a voice activation request to a server side, receive a verification code that is returned by the server side and that corresponds to the first account, and call, by using the first application, a voice communication authorization interface to send an authentication request including the verification code to the server side; and a voice communication management unit 82, configured to: send, by using the voice communication authorization interface, the authentication request including the verification code to the server side, and control, based on an authentication result sent by the server side, an operation of calling a voice communication service interface.

In this embodiment, the electronic device may be a device such as a smartphone, a tablet computer, or a desktop computer. At least one third party application (corresponding to the foregoing first application) can be installed and run in the electronic device. The third party application may be an application that has a requirement on multi-user voice communication.

The first application may be any one of the at least one third party application installed in the electronic device. For example, a user installs an application A, an application B, and an application C. The application A may be used as the first application in this embodiment if the application A is currently enabled.

The first account may be an account used by the user to log in to the first application. The first account may be obtained by performing, by using the first application, registering on a corresponding server of the first application on the server side. The first account may specifically include information such as an account name and an account password that are used by the user to log in to the first application.

Initiation of the voice activation request may be that the user sends the voice activation request by using the first account after enabling the third party application, and logging in to the third party application based on the first account. The voice activation request includes at least: identification information of the first application and the first account.

The identification information of the first application may be information such as a name and/or a number of the first application.

Correspondingly, that the server side determines, according to the voice activation request, that the first account is a legitimate account may be obtaining a list of legitimate accounts based on the identification information of the first application, and determining that the first account is a legitimate account if the first account is in the list of legitimate accounts. It may be understood that in this embodiment, the server side is not necessarily only one server, but may be a server cluster including multiple servers. The foregoing operation of verifying legitimacy of the account may be an operation performed by the server corresponding to the first application on the server side.

In addition, allocation of the corresponding verification code to the first account may be an operation performed by a voice communication authentication platform of the server side. The voice communication authentication platform may be an SDK platform.

In some embodiments, the method for obtaining the verification code may be instructing, by the server corresponding to the first application, a voice communication authorization server to allocate the verification code.

In the present disclosure, the first application can be bound to the corresponding voice communication service interface by means of allocation of the verification code. A specific operation is calling, by using the first application, the voice communication authorization interface to send the authentication request including the verification code to the server side, so that the server side performs authentication based on the authentication request, and obtains the authentication result. The authentication result may include at least the first account and an authorization account.

In addition, the voice communication management unit is configured to: when the authentication result sent by the server side indicates that authentication succeeds, control the first application using the first account to call the voice communication service interface to perform voice communication processes.

When the authentication result indicates that authentication succeeds, obtaining, by the first application, that is, the third party application, permission to use a server interface for voice communication.

It may be understood that in this embodiment, the voice communication authorization interface and the voice communication service interface are based on a same software development suit, for example, a software development kit (SDK). Compared with the existing technology, complexity of a voice communication interface is reduced, and adaption difficulty of the third party application is reduced.

As can be seen, by means of the foregoing solution, a first application using a first account may be controlled to initiate a voice activation request to a server side, so that the server side determines, according to the voice activation request, that the first account is a legitimate account. A verification code that is returned by the server side and that corresponds to the first account is received. A voice communication authorization interface is called by using the first application to send an authentication request including the verification code to the server side. An operation of calling a voice communication service interface is controlled based on an authentication result sent by the server side. In this way, a server interface for secure voice communication can be provided to a third party application, thereby improving security when a user uses the third party application. In addition, an audio function provided in the third party application is not used. Therefore, a problem of audio conflict occurring in the third party application is avoided, and a problem that different third party applications are not compatible can be avoided.

Figure 9:
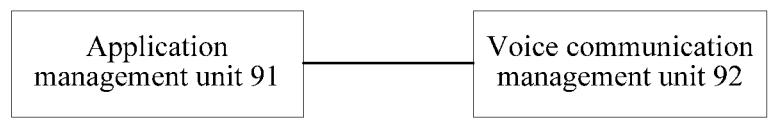
FIG. 9 is a second schematic structural diagram of an electronic device according to an embodiment of the present disclosure.

An embodiment of the present disclosure provides an electronic device. As shown in FIG. 9, the electronic device includes: an application management unit 91, configured to: control a first application using a first account to send a voice activation request to a server side, receive a verification code that is returned by the server side and that corresponds to the first account, and call, by using the first application, a voice communication authorization interface to send an authentication request including the verification code to the server side; and a voice communication management unit 92, configured to: send, by using the voice communication authorization interface, the authentication request including the verification code to the server side, and control, based on an authentication result sent by the server side, an operation of calling a voice communication service interface.

In this embodiment, the electronic device may be a device such as a smartphone, a tablet computer, or a desktop computer. At least one third party application (corresponding to the foregoing first application) can be installed and run in the electronic device. The third party application may be an application that has a requirement on multi-user voice communication.

The first application may be any one of the at least one third party application installed in the electronic device. For example, a user installs an application A, an application B, and an application C. The application A may be used as the first application in this embodiment if the application A is currently enabled.

The first account may be an account used by the user to log in to the first application. The first account may be obtained by performing, by using the first application, registering on a corresponding server of the first application on the server side. The first account may specifically include information such as an account name and an account password that are used by the user to log in to the first application.

Initiation of the voice activation request may be that the user sends the voice activation request by using the first account after enabling the third party application, and logging in to the third party application based on the first account. The voice activation request includes at least: identification information of the first application and the first account.

The identification information of the first application may be information such as a name and/or a number of the first application.

Correspondingly, that the server side determines, according to the voice activation request, that the first account is a legitimate account may be obtaining a list of legitimate accounts based on the identification information of the first application, and determining that the first account is a legitimate account if the first account is in the list of legitimate accounts. It may be understood that in this embodiment, the server side is not necessarily only one server, but may be a server cluster including multiple servers. The foregoing operation of verifying legitimacy of the account may be an operation performed by the server corresponding to the first application on the server side.

In addition, allocation of the corresponding verification code to the first account may be an operation performed by a voice communication authentication platform of the server side. The voice communication authentication platform may be an SDK platform.

In some embodiments, the method for obtaining the verification code may be instructing, by the server corresponding to the first application, a voice communication authorization server to allocate the verification code.

In the present disclosure, the first application can be bound to the corresponding voice communication service interface by means of allocation of the verification code. A specific operation is calling, by using the first application, the voice communication authorization interface to send the authentication request including the verification code to the server side, so that the server side performs authentication based on the authentication request, and obtains the authentication result. The authentication result may include at least the first account and an authorization account.

In addition, in this embodiment, the voice communication management unit is configured to: when the authentication result sent by the server side indicates that authentication succeeds, control the first application using the first account to call the voice communication service interface to perform voice communication processes, that is, when the authentication result indicates that authentication succeeds, obtaining, by the first application, that is, the third party application, permission to use a server interface for voice communication.

It may be understood that in this embodiment, the voice communication authorization interface and the voice communication service interface are based on a same software development suit, for example, an SDK.

In addition, the voice communication management unit is configured to: obtain an authorization identifier for the first account from the authentication result; and control the first application using the first account to obtain authorization for the voice communication interface based on the authorization identifier, and exchange voice data by using the voice communication service interface.

In this embodiment, a method for establishing a voice communication group when a voice communication operation is performed is described. Specifically, the voice communication management unit is configured to: control the first application using the first account to initiate a first voice communication operation; generate a first voice communication request according to the first voice communication operation, where the first voice communication request includes the authorization identifier of the first account and a communications identifier of first voice communication; send the first voice communication request to the server side; and receive a notification that is sent by the server side and that indicates that the first application using the first account joins a first voice communication group.

The method for initiating the first voice communication operation may be: tapping a button for communication by using an operation interface, and determining the operation of initiating the first voice communication operation after detecting that the button is tapped. As shown in FIG. 4, assuming that a button 42 for voice communication is displayed on a display interface 41 of the current first application, a user may tap the button 42 to initiate the first voice communication operation.

The generating a first voice communication request according to the first voice communication operation may be: generating the first voice communication request including at least the identification information of the first application, the name of the first account, the authorization identifier of the first account, and the communications identifier of the first voice communication. The communications identifier of the first voice communication may be a unique identifier (UniqueID).

In addition, the first voice communication operation is a voice communication operation currently initiated by the user.

The sending the first voice communication request to the server side may be: sending the first voice communication request to the server side by using the voice communication service interface. Correspondingly, that the server side generates a first voice communication group based on the first voice communication request may be: generating the first voice communication group for the current first voice communication request based on the identification information of the first application, the name of the first account, the authorization identifier of the first account, and the communications identifier of the first voice communication in the first voice communication request, and generating identification information for the voice communication group. It may be understood that the identification information of the first voice communication group uniquely maps and corresponds to the communications identifier of the first voice communication.

Figure 10:
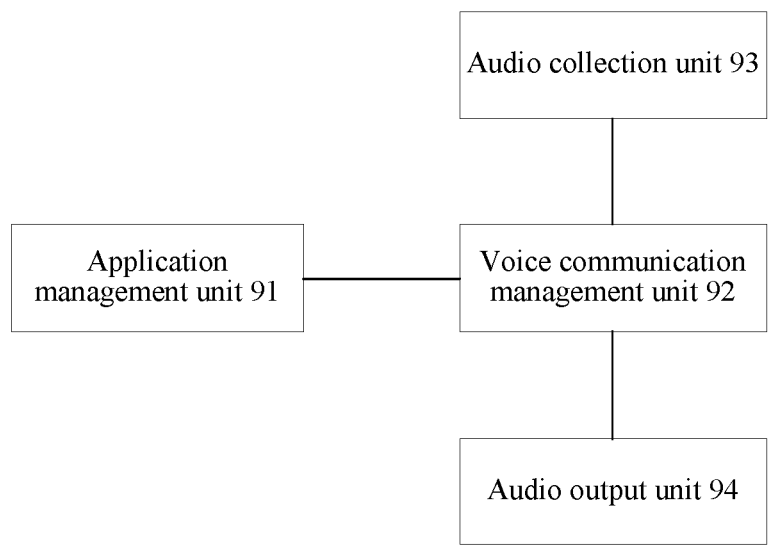
FIG. 10 is a third schematic structural diagram of an electronic device according to an embodiment of the present disclosure.

In some embodiments, based on the foregoing operations, this embodiment may further provide an electronic device based on the established first voice communication group. Referring to FIG. 10, the electronic device is shown based on FIG. 9. The electronic device further includes: an audio collection unit 93, configured to collect voice data according to control of the voice communication management unit; and an audio output unit 94, configured to output voice data according to control of the voice communication management unit.

Correspondingly, the voice communication management unit 92 is further configured to: receive a notification that is sent by the server side and that indicates that the first application using the second account joins the first voice communication group, where the second account is an account that is used by another electronic device different from the electronic device to log in to the first application; collect voice data based on the notification, and send, by using the server side, the collected voice data to the first application using the second account in the first voice communication group; and obtain, from the server side, voice data shared by the first application using the second account in the first voice communication group, and output the voice data.

The first application using the second account may be logged in to by another user other than the electronic device in this embodiment by using the second account and the electronic device.

The collection of the voice data may be voice collection performed by enabling a microphone of the electronic device. In addition, the voice data may be played by using a speaker of the electronic device.

Further, the voice communication management unit 92 is further configured to: control the first application using the first account to initiate an operation of terminating the first voice communication; generate, according to the operation of terminating the first voice communication, a first voice communication termination request including the authorization identifier of the first account and the communications identifier of the first voice communication; and send the first voice communication termination request to the server side, so that the server side deletes, according to the authorization identifier of the first account and the communications identifier of the first voice communication in the first voice communication termination request, the first application using the first account from the corresponding first voice communication group.

The first voice communication termination request includes at least the communications identifier of the first voice communication and the authorization identifier of the first account, and in addition, may further include information such as identification information of the first application and a name of the first account.

After deleting the first application using the first account from the corresponding first voice communication group, the electronic device side may turn off a voice collection apparatus, for example, turn off the microphone.

As can be seen, by means of the foregoing solution, a first application using a first account may be controlled to initiate a voice activation request to a server side, so that the server side determines, according to the voice activation request, that the first account is a legitimate account. A verification code that is returned by the server side and that corresponds to the first account is received. A voice communication authorization interface is called by using the first application to send an authentication request including the verification code to the server side. An operation of calling a voice communication service interface is controlled based on an authentication result sent by the server side. In this way, a server interface for secure voice communication can be provided to a third party application, thereby improving security when a user uses the third party application. In addition, an audio function provided in the third party application is not used. Therefore, a problem of audio conflict occurring in the third party application is avoided, and a problem that different third party applications are not compatible can be avoided.

Figure 11:
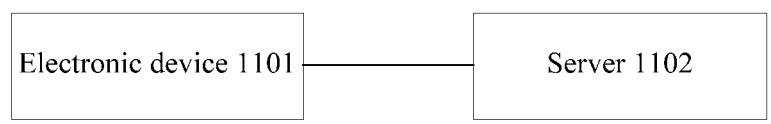
FIG. 11 is a schematic structural diagram of a system according to an embodiment of the present disclosure.

An embodiment of the present disclosure provides a voice communication processing system. As shown in FIG. 11, the system includes: an electronic device 1101, configured to: control a first application using a first account to send a voice activation request to a server side, receive a verification code that is returned by the server side and that corresponds to the first account, and call, by using the first application, a voice communication authorization interface to send an authentication request including the verification code to the server side; and control, based on an authentication result sent by the server side, an operation of calling a voice communication service interface; and a server 1102, configured to: determine, according to the voice activation request, that the first account is a legitimate account, and allocate the corresponding verification code to the first account; and authenticate, based on the verification code included in the authentication request, whether the first application using the first account can call the voice communication service interface, to obtain the authentication result.

In this embodiment, the structure and function of the electronic device may the same as those described in relation to FIGS. 8 and 9, the details of which are not described herein again.

In addition, the server in this embodiment may be a server or may be a server cluster including multiple servers.

As can be seen, by means of the foregoing solution, a first application using a first account may be controlled to initiate a voice activation request to a server side, so that the server side determines, according to the voice activation request, that the first account is a legitimate account. A verification code that is returned by the server side and that corresponds to the first account is received. A voice communication authorization interface is called by using the first application to send an authentication request including the verification code to the server side. An operation of calling a voice communication service interface is controlled based on an authentication result sent by the server side. In this way, a server interface for secure voice communication can be provided to a third party application, thereby improving security when a user uses the third party application. In addition, an audio function provided in the third party application is not used. Therefore, a problem of audio conflict occurring in the third party application is avoided, and a problem that different third party applications are not compatible can be avoided.

In the several embodiments provided in the present disclosure, it should be understood that the disclosed device and method may be implemented in other manners. The described device embodiment is merely exemplary. For example, the unit division in the present disclosure is merely logical function division and there may be other divisions used during actual implementations. For example, multiple units or components may be combined or integrated into another system, or some features may be omitted or not performed. In addition, the displayed or discussed mutual couplings or direct couplings or communication connections between the components may be implemented by using some interfaces. The indirect couplings or communication connections between the devices or units may be implemented in electronic, mechanical, or other forms.

In some embodiment, a unit, as described in the present disclosure, may refer to one or more computer programs designed to implement specific functions. When executed by one or more processors, the computer programs may perform the functions of that specific unit.

The units described as separate parts may or may not be physically separate, and parts displayed as units may or may not be physical units, may be located in one position, or may be distributed on multiple network units. Some or all of the units may be selected according to actual requirements to achieve the objectives of the solutions of the embodiments.

In addition, all functional units in the embodiments of the present disclosure may be integrated into one processing module, or each functional unit serves as one unit, or two or more than two units are integrated into one unit. The foregoing integrated units not only may be implemented in a form of hardware, but also may be implemented in a form of hardware plus a software functional unit.

A person of ordinary skill in the technology may understand that all or some of the steps of the method embodiments may be implemented by a computer program instructing relevant hardware. The program may be stored in a computer-readable storage medium. When the program is executed, the steps of the method embodiments are performed. The foregoing storage medium includes any medium that can store program code, such as a mobile storage device, a read-only memory (ROM), a random access memory (RAM), a magnetic disk, or an optical disc. The storage medium includes a group of instructions, and causes, when executing the instructions, at least one processor to perform the following operations: controlling a first application using a first account to initiate a voice activation request to a server side, so that the server side determines, according to the voice activation request, that the first account is a legitimate account, and allocates a corresponding verification code to the first account; receiving the verification code that is returned by the server side and that corresponds to the first account; calling, by using the first application, a voice communication authorization interface to send an authentication request including the verification code to the server side, so that the server side authenticates, based on the verification code included in the authentication request, whether the first application using the first account can call a voice communication service interface, to obtain an authentication result; and controlling, based on the authentication result sent by the server side, an operation of calling the voice communication service interface.

The foregoing descriptions are merely specific implementations of the present disclosure, but are not intended to limit the protection scope of the present disclosure. Any variation or replacement readily figured out by a person skilled in the technology within the technical scope disclosed in the present disclosure shall fall within the protection scope of the present disclosure. Therefore, the protection scope of the present disclosure shall be subject to the protection scope of the claims.

What is claimed is:

1. A voice communication processing method, applied to an electronic device, and comprising:
    initiating from a first account, through a first application, a voice activation request to a third-party application server, the third-party application server being a back-end server of the first application, wherein the third-party application server requests and obtains a verification code from a voice communication server in response to receiving the voice activation request;
    receiving, by the electronic device, the verification code that is returned by the third-party application server and that corresponds to the first account, after the third-party application server receives the verification code from the voice communication server;
    calling, through the first application, a voice communication authorization interface and sending an authentication request comprising the verification code to the voice communication server by using the voice communication authorization interface executed on the electronic device;
    receiving, from the voice communication server, an authentication result; and
    initiating operations of a voice communication service interface, based on the authentication result, wherein the voice communication authorization interface and the voice communication service interface are based on a same software development kit (SDK) provided for third-party applications.

2. The method according to claim 1, further comprising:
    when the authentication result sent by the voice communication server indicates that authentication succeeds, initiating the operations of the voice communication service interface to perform voice communication processes.

3. The method according to claim 1, further comprising:
    obtaining an authorization identifier for the first account from the authentication result when the authentication result indicates a successful authentication; and
    obtaining, by the first application, an authorization for using the voice communication service interface based on the authorization identifier, and
    exchanging voice data by using the voice communication service interface after the authorization is obtained.

4. The method according to claim 3, further comprising:
    after the authorization for using the voice communication service interface is obtained by the first application, initiating a first voice communication operation;
    generating a first voice communication request according to the first voice communication operation, wherein the first voice communication request comprises the authorization identifier of the first account and a communications identifier of first voice communication;
sending, by the voice communication service interface, the first voice communication request to the voice communication server;
receiving, by the voice communication service interface, a group identification of a voice communication group containing the first account from the voice communication server; and
exchanging the voice data by using the voice communication service interface according to the group identification.

5. The method according to claim 4, further comprising:
receiving, by the voice communication service interface from the voice communication server, a notification that indicates that a second account of the first application joins the first voice communication group, wherein the second account is an account that is logged in to the first application on an electronic device different from the electronic device of the first account;
receiving first voice data based on the notification; and
receiving, from the voice communication server, second voice data shared by the electronic device of the second account of the first application in the first voice communication group, and outputting the voice data.

6. The method according to claim 5, further comprising:
initiating, using the first account, an operation of terminating the first voice communication;
generating, according to the operation of terminating the first voice communication, a first voice communication termination request comprising the authorization identifier of the first account and the communications identifier of the first voice communication; and
sending the first voice communication termination request to the voice communication server, the voice communication server deleting, according to the authorization identifier of the first account and the communications identifier of the first voice communication in the first voice communication termination request, the first application using the first account from the corresponding first voice communication group.

7. The method according to claim 4, further comprising:
notifying, by the voice communication service interface, the first application that the first account successfully joins the voice communication group.

8. The method according to claim 7, wherein a value of the group identification is transparent to the first application.

9. The method according to claim 4, wherein initiating a first voice communication operation comprises:
displaying an option for initiating the first voice communication on a display interface of the first application;
detecting a user selection on the option; and
initiating the first voice communication in response to the user selection.

10. An electronic device, comprising:
a memory; and
a processor coupled to the memory and configured to:
through first application and using a first account, send a voice activation request to a third-party application server, the third-party application server being a back-end server of the first application;
receive a verification code that is returned by the third-party application server and that corresponds to the first account, the verification code being obtained by the third-party application server from a voice communication server;
call, through the first application, a voice communication authorization interface;
send, by using the voice communication authorization interface, an authentication request comprising the verification code to the voice communication server; and
initiate, based on an authentication result received from the voice communication server, an operation of calling a voice communication service interface,
wherein the voice communication authorization interface and the voice communication service interface are based on a same software development kit (SDK) provided for third-party applications,
wherein the processor is further configured to:
after the authentication result indicates a successful authentication, initiate, through the first application using the first account, a first voice communication operation;
generate a first voice communication request according to the first voice communication operation, wherein the first voice communication request comprises the authorization identifier of the first account and a communications identifier of first voice communication;
send, by using the voice communication service interface, the first voice communication request to the voice communication server;
receive, by using the voice communication service interface, a notification that is sent by the voice communication server and that indicates that the first application using the first account joins a first voice communication group; and
activate, by using the voice communication service interface, a microphone of the electronic device for voice data collection based on the notification.

11. The electronic device according to claim 10, wherein the processor is configured to:
when the authentication result sent by the voice communication server indicates that authentication succeeds, call, through the first application using the first account, the voice communication service interface to perform voice communication processes.

12. The electronic device according to claim 10, wherein the processor is configured to:
obtain an authorization identifier for the first account from the authentication result when the authentication result indicates a successful authentication; and
obtain, through the first application using the first account, authorization for using the voice communication service interface based on the authorization identifier, and exchange voice data by using the voice communication service interface after the authorization is obtained.

13. The electronic device according to claim 10, wherein the processor is further configured to:
receive a notification that is sent by the voice communication server and that indicates that a second account of the first application joins the first voice communication group, the second account being an account that is logged in to the first application on an electronic device different from the electronic device of the first account;
collect first voice data based on the notification; and
obtain, from the voice communication server, second voice data shared by the electronic device of the second account of the first application in the first voice communication group, and output the second voice data.

14. The electronic device according to claim 13, wherein the processor is configured to:

control the first application using the first account to initiate an operation of terminating the first voice communication;

generate, according to the operation of terminating the first voice communication, a first voice communication termination request comprising the authorization identifier of the first account and the communications identifier of the first voice communication; and send the first voice communication termination request to the voice communication server.

15. The electronic device according to claim 14, wherein the processor is further configured to:

in response to the first account used by the first application being deleted from the first voice communication group based on the first voice communication termination request, turn off the microphone of the electronic device.

16. The electronic device according to claim 10, wherein the voice communication authorization interface and the voice communication service interface are configured to operate in the electronic device.

17. The electronic device according to claim 10, wherein:

when the voice communication service interface activates the microphone for the voice data collection and when the voice communication service interface plays voice data using a speaker of the electronic device, an audio function provided by the third party application is not used.

18. A voice communication processing system, comprising:

an electronic device, configured to: send, through a first application using a first account, a voice activation request to a third-party application server, the third-party application server being a backend server of the first application; receive a verification code that is returned by the third-party application server and that corresponds to the first account, the verification code being requested and obtained by the third-party application server from the voice communication server in response to the voice activation request; and call, by using the first application, a voice communication authorization interface to send an authentication request comprising the verification code to a voice communication server; and initiate, based on an authentication result sent by the voice communication server, an operation of calling a voice communication service interface, wherein the voice communication authorization interface and the voice communication service interface are based on a same software development kit (SDK) provided for third-party applications; and the third-party application server, configured to: determine, according to the voice activation request, that the first account is a legitimate account; and request, in response to the voice activation request, the verification code from the voice communication server; and send the verification code to the electronic device;

the voice communication server, configured to: allocate the verification code to the first account and send the verification code to the third-party application server; and authenticate, based on the verification code comprised in the authentication request from the electronic device, whether the first application using the first account can call the voice communication service interface, and obtain and send the authentication result to the electronic device.

19. A non-transitory computer storage medium, storing one or more computer instructions, and when executed by at least one processor, the computer instructions perform the following operations:

initiating, through first application using a first account, a voice activation request to a third-party application server, the third-party application server being a backend server of the first application;

receiving a verification code from the third-party application server, the verification code being obtained by the third-party application server from a voice communication server;

calling, through the first application, a voice communication authorization interface to send an authentication request comprising the verification code to the voice communication server;

receiving, from the voice communication server, an authentication result;

initiating, based on the authentication result, an operation of the voice communication service interface, wherein the voice communication authorization interface and the voice communication service interface are based on a same software development kit (SDK) provided for third-party applications;

after the authentication result indicates a successful authentication, initiating, through the first application using the first account, a first voice communication operation;

generating a first voice communication request according to the first voice communication operation, wherein the first voice communication request comprises the authorization identifier of the first account and a communications identifier of first voice communication;

sending, by using the voice communication service interface, the first voice communication request to the voice communication server by using the voice communication service interface;

receiving, by using the voice communication service interface, a notification that is sent by the voice communication server and that indicates that the first application using the first account joins a first voice communication group; and activating, by using the voice communication service interface, a microphone of the electronic device for voice data collection based on the notification.

* * * * *